(12) United States Patent
Sugihara

(10) Patent No.: US 11,475,299 B2
(45) Date of Patent: Oct. 18, 2022

(54) IDENTIFICATION/CLASSIFICATION DEVICE AND IDENTIFICATION/CLASSIFICATION METHOD

(71) Applicant: Mitsubishi Electric Corporation, Tokyo (JP)

(72) Inventor: Kenya Sugihara, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 522 days.

(21) Appl. No.: 16/624,838

(22) PCT Filed: Aug. 10, 2017

(86) PCT No.: PCT/JP2017/029086
§ 371 (c)(1),
(2) Date: Dec. 19, 2019

(87) PCT Pub. No.: WO2019/030895
PCT Pub. Date: Feb. 14, 2019

(65) Prior Publication Data
US 2020/0117994 A1    Apr. 16, 2020

(51) Int. Cl.
*G06N 3/08*    (2006.01)
*G06N 3/04*    (2006.01)
*G06V 10/82*    (2022.01)

(52) U.S. Cl.
CPC ............... *G06N 3/08* (2013.01); *G06N 3/04* (2013.01); *G06V 10/82* (2022.01)

(58) Field of Classification Search
CPC ............. G06N 3/08; G06N 3/04; G06V 10/82
See application file for complete search history.

(56) References Cited

U.S. PATENT DOCUMENTS

| 5,150,450 A | 9/1992 | Swenson et al. |
| 5,832,466 A | 11/1998 | Feidgajer |
| 6,421,654 B1 * | 7/2002 | Gordon ................. G06K 9/627 706/26 |
| 9,330,321 B2 * | 5/2016 | Schamp ................. G06V 20/58 |
| 11,023,806 B2 * | 6/2021 | Sawada ................ G06N 3/0454 |

(Continued)

FOREIGN PATENT DOCUMENTS

| JP | 2016-110232 A | 6/2016 |
| JP | 2016-146174 A | 8/2016 |

OTHER PUBLICATIONS

Office Action dated Jan. 4, 2021 in corresponding Canadian Application No. 3,069,645.

(Continued)

*Primary Examiner* — Fayyaz Alam
(74) *Attorney, Agent, or Firm* — Birch, Stewart, Kolasch & Birch, LLP

(57) ABSTRACT

A side information calculating unit (110) calculates side information for assisting either identification processing or classification processing. When there is a discrepancy between a processing result of either the identification processing or the classification processing, and the side information, the multilayer neural network (120) changes an output value of an intermediate layer (20) and performs either the identification processing or the classification processing again.

9 Claims, 3 Drawing Sheets

(56) References Cited

U.S. PATENT DOCUMENTS

| | | | |
|---|---|---|---|
| 2008/0089591 A1* | 4/2008 | Zhou | G06V 10/809 |
| | | | 382/224 |
| 2017/0220891 A1 | 8/2017 | Kim et al. | |
| 2019/0244101 A1* | 8/2019 | Ando | G06N 3/067 |

OTHER PUBLICATIONS

Krizhevsky et al., "ImageNet Classification with Deep Convolutional Neural Networks," in NIPS, pp. 1-9, 2012.
Summons to Attend Oral Proceedings dated Nov. 2, 2021 issued in corresponding European Patent Application No. 17 921 332.7.
European Office Action dated May 4, 2021 in corresponding European Patent Application No. 17 921 332.7.
Canadian Office Action dated Aug. 25, 2020 in corresponding Canadian Patent Application No. 3,069,645.
European Search Report dated Jul. 31, 2020 in corresponding European Patent Application No. 17 921 332.7.
Imran Shafi et al "Impact of Varying Neurons and Hidden Layers in Neural Network Architecture for a Time Frequency Application", Multitopic Conference, Dec. 1, 2006 pp. 188-193.
Raja Sekhar Dheekonda et al "Object Detection from a Vehicle Using Deep Learning Network and Future Integration with Multi-Sensor Fusion Algorithm", SAE Technical Paper Series, vol. 1, Mar. 28, 2017.
Yang Tang et al: "Identifying Controlling Nodes in Neuronal Networks in Different Scales", PLOS ONE, vol. 7, No. 7, Jul. 27, 2012.
Canadian Office Action and Search Report for Canadian Application No. 3,069,645, dated Apr. 7, 2020.

\* cited by examiner

IDENTIFICATION/CLASSIFICATION DEVICE AND IDENTIFICATION/CLASSIFICATION METHOD

TECHNICAL FIELD

The present disclosure relates to an identification/classification device for and an identification/classification method of performing either identification processing or classification processing by using a multilayer neural network.

BACKGROUND ART

In recent years, machine learning techniques called deep learning have been quickly developed, and the construction of a multilayer neural network having a high identification rate or classification accuracy rate is enabled using deep learning (for example, refer to Nonpatent Literature 1).

On the other hand, the performance of identification or classification of an image, a sound, language, or sensor data by using a multilayer neural network has improved dramatically, but does not guarantee to provide 100% correct answer.

The performance of multilayer neural networks is influenced by both the content of learning processing, and the quality or the amount of learning data used for this learning processing, and optimal learning results are not necessarily acquired at all times by the deep learning because learning algorithms have been also in the development stage.

Further, there are not fixed rules on the quality and the amount of the learning data used for the deep learning. Therefore, the current situation is that for each problem that should be solved using a multilayer neural network, learning data is collected using, as a basis, costs and experiences of practisioners.

CITATION LIST

Patent Literature

Nonpatent Literature 1: A. Krizhevsky, I. Sutskever, and G. E. Hinton, "Image Net classification with deep convolutional neural networks", in NIPS, pp. 1106-1114, 2012.

SUMMARY OF INVENTION

Technical Problem

As mentioned above, the learning processing for a multilayer neural network by using the deep learning is not always successful. Therefore, when desired performance is not provided by a multilayer neural network on which learning has been performed, it is necessary to change the learning algorithm or collect learning data, and perform relearning.

For example, by performing label attachment on data that has been mistakenly identified or classified using a multilayer neural network, and then repeating relearning, the performance of the multilayer neural network is improved.

However, because the learning processing for constructing a multilayer neural network needs many arithmetic operations, the relearning increases the operation cost of a computer and further imposes a time constraint on the computer. Therefore, the repetition of the relearning has a limitation in both cost and time.

The present disclosure is made in order to solve the above-mentioned problem, and it is therefore an object of the present disclosure to provide an identification/classification device and an identification/classification method capable of improving either the identification rate of identification processing or the classification accuracy rate of classification processing without performing relearning on a multilayer neural network on which learning has been performed.

Solution to Problem

An identification/classification device according to the present disclosure includes aside information calculating unit and a multilayer neural network. The side information calculating unit calculates side information for assisting either identification processing or classification processing. The multilayer neural network includes an input layer, an intermediate layer, and an output layer, and, when there is a discrepancy between a processing result of either the identification processing or the classification processing using data inputted to the input layer, and the side information, changes an output value of the intermediate layer and performs either the identification processing or the classification processing again.

Advantageous Effects of Invention

According to the present disclosure, when there is a discrepancy between the processing result of either the identification processing or the classification processing, and the side information, an output value of the intermediate layer is changed and either the identification processing or the classification processing is performed again. As a result, either the identification rate of the identification processing or the classification accuracy rate of the classification processing can be improved without performing relearning on the multilayer neural network on which learning has been performed.

DESCRIPTION OF EMBODIMENTS

Hereinafter, in order to explain the present invention in greater detail, an embodiment of the present invention will be described with reference to the accompanying drawings.

Embodiment 1.

Figure 1:
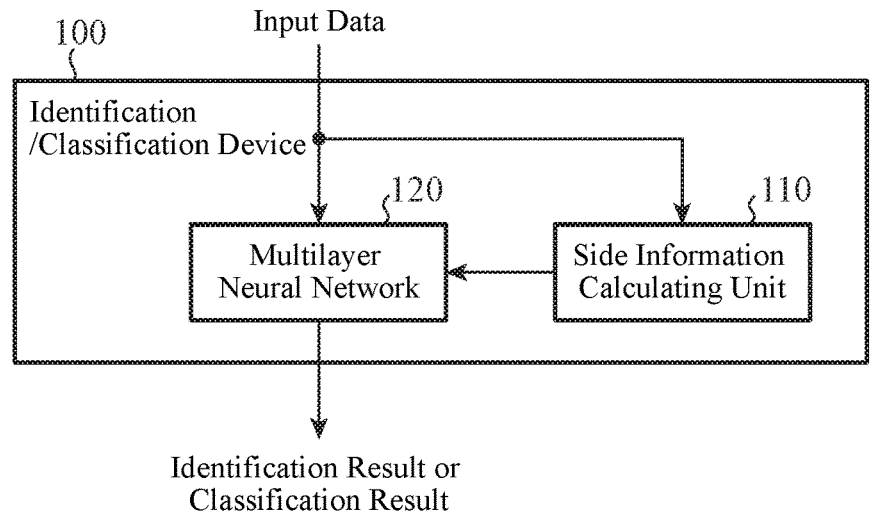
FIG. 1 is a block diagram showing the configuration of an identification/classification device according to Embodiment 1 of the present disclosure.

FIG. 1 is a block diagram showing the configuration of an identification/classification device 100 according to Embodiment 1 of the present disclosure. The identification/classification device 100 performs either identification processing or classification processing, and includes a side information calculating unit 110 and a multilayer neural network 120, as shown in FIG. 1.

Part or all of data inputted to the identification/classification device 100 is inputted to the side information calculating unit 110 and the multilayer neural network 120 at the same time.

The side information calculating unit 110 calculates side information by using the part or all of the data inputted to the identification/classification device 100, and outputs the calculated side information to the multilayer neural network 120. The side information includes a content for assisting either the identification processing or the classification processing on the input data.

For example, when by using image data about an image shot with a camera, the multilayer neural network 120 performs either the identification processing or the classification processing on an object to be shot that is seen in the image, the actual size of the object to be shot is information useful in identifying or classifying the object to be shot.

Further, when the distance between the camera and the object to be shot is known, it is possible to calculate the actual size of the object to be shot from the above-mentioned image data.

Using both the distance between the camera and the object to be shot, and the size of the object to be shot on the image (the number of pixels), the actual size of the object to be shot can be calculated from the following equation.

In the following equation, the spatial resolution shows the viewing angle of each pixel, and has a value based on the characteristics of the camera. The number of pixels is the size of the object to be shot on the image. The distance is the one between the camera and the object to be shot.

The actual size (m)=the number of pixels×the distance (km)×the spatial resolution(mrad)

The side information calculating unit 110 calculates, as the side information, the distance between the camera and the object to be shot, the distance being a parameter for acquiring the actual size of the object to be shot.

For example, the side information calculating unit 110 calculates the distance between the camera and the object to be shot on the basis of multiple pieces of image data having different viewpoints, by using a triangulation method.

As an alternative, the side information calculating unit 110 may calculate the distance between the camera and the object to be shot on the basis of multiple pieces of image data having different viewpoints, by using Structure from Motion (SfM).

The side information calculating unit 110 may calculate the distance between the camera and the object to be shot by using detection data of a distance measurement sensor. The distance measurement sensor is arranged in the vicinity of the camera and, for example, detects the distance to a measurement point in a detection range including the object to be shot, and is implemented by an infrared depth sensor or a laser sensor.

The side information calculating unit 110 may calculate the distance between the camera and the object to be shot by using prior information about a location where the object to be shot exists, position information about the camera, and map information about an area in the vicinity of the camera. The prior information shows a building or a geographical feature in which the object to be shot exists. For example, the side information calculating unit 110 specifies information about the position at which the object to be shot exists on the basis of the prior information and the map information, and calculates the distance between the camera and the object to be shot from the specified position information about the object to be shot and the position information about the camera.

Although the various methods of calculating the distance between the camera and the object to be shot are shown, the side information calculating unit 110 may select an appropriate method out of these methods in accordance with either the configuration of the camera system for shooting an image of the object to be shot, or the allowable time to calculate the above-mentioned distance.

For example, in a case in which the camera system includes the above-mentioned distance measurement sensor, the side information calculating unit 110 selects the method of calculating the above-mentioned distance by using the detection information of the distance measurement sensor.

Further, when the side information calculating unit 110 can calculate the above-mentioned distance within the allowable calculation time, the side information calculating unit may calculate the above-mentioned distance from image data.

The multilayer neural network 120 performs either the identification processing or the classification processing by using input data, and may be called multilayer perceptron.

The multilayer neural network 120 should just perform either the identification processing or the classification processing, and may be a convolution neural network.

Further, it is assumed that learning processing has been performed on the multilayer neural network 120 in such a way that a parameter used when calculating an output value from the input data has a value suitable for either the identification processing or the classification processing.

Although the identification/classification device 100 may include a learning unit that performs the learning processing on the multilayer neural network 120, an external device disposed separately from the identification/classification device 100 may include the learning unit.

Figure 2:
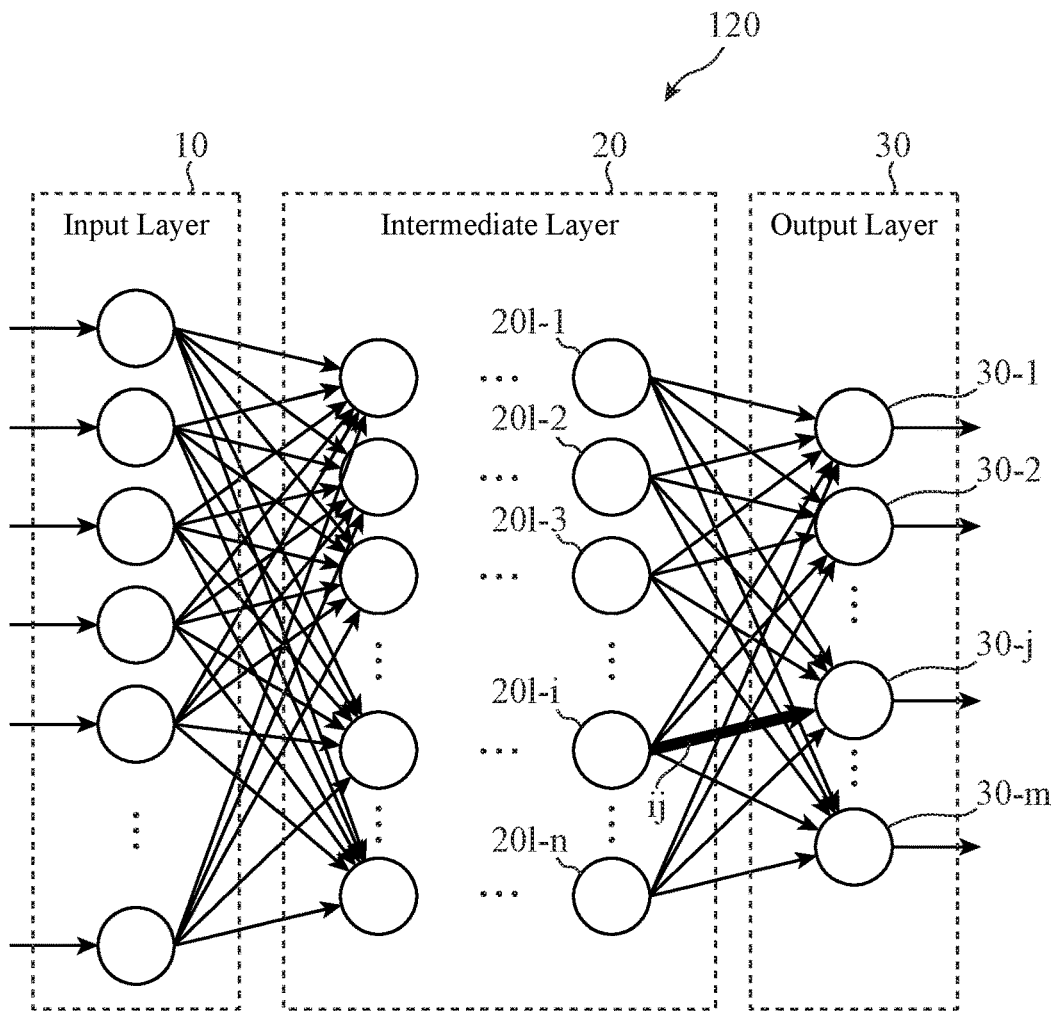
FIG. 2 is a diagram showing an example of the configuration of a multilayer neural network in Embodiment 1.

FIG. 2 is a diagram showing an example of the configuration of the multilayer neural network 120. The multilayer neural network 120 includes three types of layers: an input layer 10, an intermediate layer 20, and an output layer 30, as shown in FIG. 2.

The input layer 10 includes multiple nodes to which data that is a target for either the identification processing or the classification processing is inputted. The intermediate layer 20 is called a so-called hidden layer, and includes multiple nodes arranged in one or more layers. The output layer 30 includes nodes whose number is equal to the number of outputs of either the identification processing or the classification processing. For example, in a case in which one correct answer is acquired by either the identification processing or the classification processing, the number of nodes of the output layer 30 is one. The output layer 30 shown in FIG. 2 includes m nodes corresponding to the number of identification results or the number of classified classes.

The multiple nodes that constitute the multilayer neural network 120 are connected by branches called edges. For example, each of the multiple nodes in the input layer 10 is connected to each of the multiple nodes arranged in the first layer in the intermediate layer 20 by an edge. In the case in which the intermediate layer 20 is constituted by multiple layers, each of the multiple nodes arranged in a preceding layer is connected to each of the multiple nodes arranged in a layer subsequent to the preceding layer by an edge. Each node in the output layer 30 is connected to each of the multiple nodes arranged in the last layer in the intermediate layer 20 (the layer immediately preceding the output layer 30) by an edge.

A weight w calculated in the learning processing is assigned to each edge.

Further, a bias b calculated in the learning processing is assigned to each of the one or more nodes that constitute the output layer 30.

For example, in a case in which each node 201-$i$ in the last layer in the intermediate layer 20 is connected to each node 30-$j$ in the output layer 30 by an edge ij, a weight $w_{ij}$ calculated in the learning processing is assigned to the edge ij. Further, a bias $b_j$ calculated in the learning processing is assigned to each node 30-$j$.

Because the last layer in the intermediate layer 20 includes n nodes, i has one of the values 1, 2, . . . , and n. Similarly, because the output layer 30 includes m nodes, j has one of the values 1, 2, . . . , and m.

Data to be processed that is inputted to each of the multiple nodes of the input layer 10 is outputted to each of the multiple nodes of the intermediate layer 20.

Each node 201-$i$ arranged in the last layer in the intermediate layer 20 performs a computation by using an output value of each of the multiple nodes arranged in the preceding layer, and outputs an output value $x_i$ that is a computation result to each node 30-$j$ of the output layer 30.

For example, when the activating function of the output layer 30 is the softmax function, each node 30-$j$ calculates $p_j$ that is the probability that a result of either the identification processing or the classification processing is acquired, by performing a computation shown in the following equation (1) by using the product of the weight $w_{ij}$ and the output value $x_i$.

In the following equation (1), the exponential part of the exponential function with base e is the sum of the product of the weight $w_{ij}$ and the output value $x_i$, and the bias $b_j$. R is a value calculated from the following equation (2).

$$p_j = \frac{e^{\Sigma_i w_{ij} x_i + b_j}}{R} \quad (1)$$

$$R = \sum_{j=1}^{m} e^{\Sigma_i w_{ij} x_i + b_j} \quad (2)$$

The output layer 30 identifies the j-th node at which the above-mentioned probability $p_j$ is the highest, in accordance with the following equation (3). The node identified in accordance with the following equation (3) has either an output value showing that a processing target is identified as c or an output value showing that the processing target is classified as a class c.

$$c = \underset{j}{\operatorname{argmax}} p_j \quad (3)$$

Further, when there is a discrepancy between the processing result (the above-mentioned output value) calculated in the output layer 30 and the above-mentioned side information, the multilayer neural network 120 changes an output value of the intermediate layer 20 and performs either the identification processing or the classification processing again.

For example, when the multilayer neural network 120 classifies the type of a ship seen in a shot image acquired by shooting with a camera, information about the size of the ship plays an auxiliary role in classifying the type of the ship.

Therefore, the side information calculating unit 110 calculates information showing what size the ship seen in the shot image has, and outputs the information to the multilayer neural network 120.

When there is a discrepancy between the above-mentioned side information calculated by the side information calculating unit 110 and the output value calculated by the output layer 30, the output value being the processing result, the multilayer neural network 120 changes an output value of the intermediate layer 20 and performs the classification processing again. As a result, the classification accuracy rate of the classification processing can be improved without performing relearning on the multilayer neural network 120.

Instead of the information showing what size the ship seen in the shot image has, the side information calculating unit 110 may acquire, as the side information, information showing a class that cannot be a subject of classification, on the basis of the size of the ship seen in the shot image. For example, when the ship is seen in the shot image while the ship has a size of the order of several tens of pixels, even though the distance between the camera and the ship is of the order of several tens of meters, there is a high possibility that the ship is not a large-sized one. At this time, the side information calculating unit 110 calculates the side information showing that large-sized ships cannot be a class that is a subject of classification.

Further, the side information calculating unit 110 may determine one or more classes having a very high possibility, and set the one or more classes as the side information.

For example, the side information calculating unit 110 compares the size of the ship seen in the shot image and a threshold, and when the size of the ship in the shot image is smaller than the above-mentioned threshold, determines that there is a high possibility that the ship is a small one and outputs information showing a small ship as the side information.

In addition, on the basis of the size of the ship seen in the shot image, the side information calculating unit 110 may calculate, as a numerical value, likelihood that the ship is classified as a class.

For example, the side information calculating unit 110 calculates a numerical value showing likelihood that the ship seen in the shot image is classified as small ships, a numerical value showing likelihood that the ship is classified as medium-sized ships, and a numerical value showing likelihood that the ship is classified as large-sized ships, and sets these numerical values as the side information.

Figure 3A:
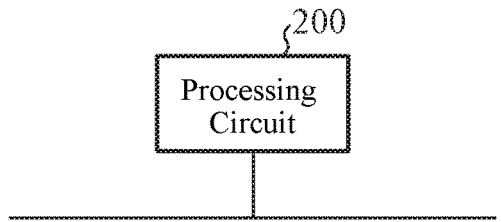
FIG. 3A is a block diagram showing a hardware configuration for implementing the functions of the identification/classification device according to Embodiment 1.
Figure 3B:
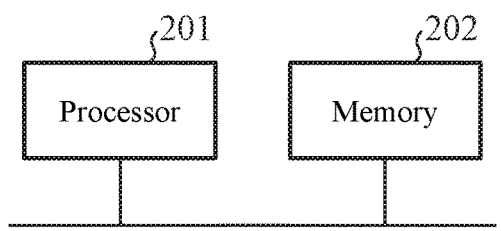
FIG. 3B is a block diagram showing a hardware configuration for executing software that implements the functions of the identification/classification device according to Embodiment 1.

FIG. 3A is a block diagram showing a hardware configuration for implementing the functions of the identification/classification device 100. In addition, FIG. 3B is a block diagram showing a hardware configuration for executing software that implements the functions of the identification/classification device 100. Each of the functions of the side information calculating unit 110 and the multilayer neural network 120 in the identification/classification device 100 is implemented by a processing circuit. More specifically, the identification/classification device 100 includes a processing circuit for performing each of processes in a flow chart shown in FIG. 4.

The processing circuit may be either hardware for exclusive use or a central processing unit (CPU) that executes a program stored in a memory 202.

In a case in which the processing circuit is hardware for exclusive use shown in FIG. 2A, the processing circuit 200 is, for example, a single circuit, a composite circuit, a programmable processor, a parallel programmable processor, an application specific integrated circuit (ASIC), a field-programmable gate array (FPGA), or a combination of these circuits. The functions of the side information calculating unit 110 and the multilayer neural network 120 may be implemented by separate processing circuits, or may be implemented collectively by a single processing circuit.

In a case in which the processing circuit is a processor 201 shown in FIG. 2B, each of the functions of the side information calculating unit 110 and the multilayer neural network 120 is implemented by software, firmware, or a combination of software and firmware. The software or the firmware is described as a program and the program is stored in the memory 202.

Figure 4:
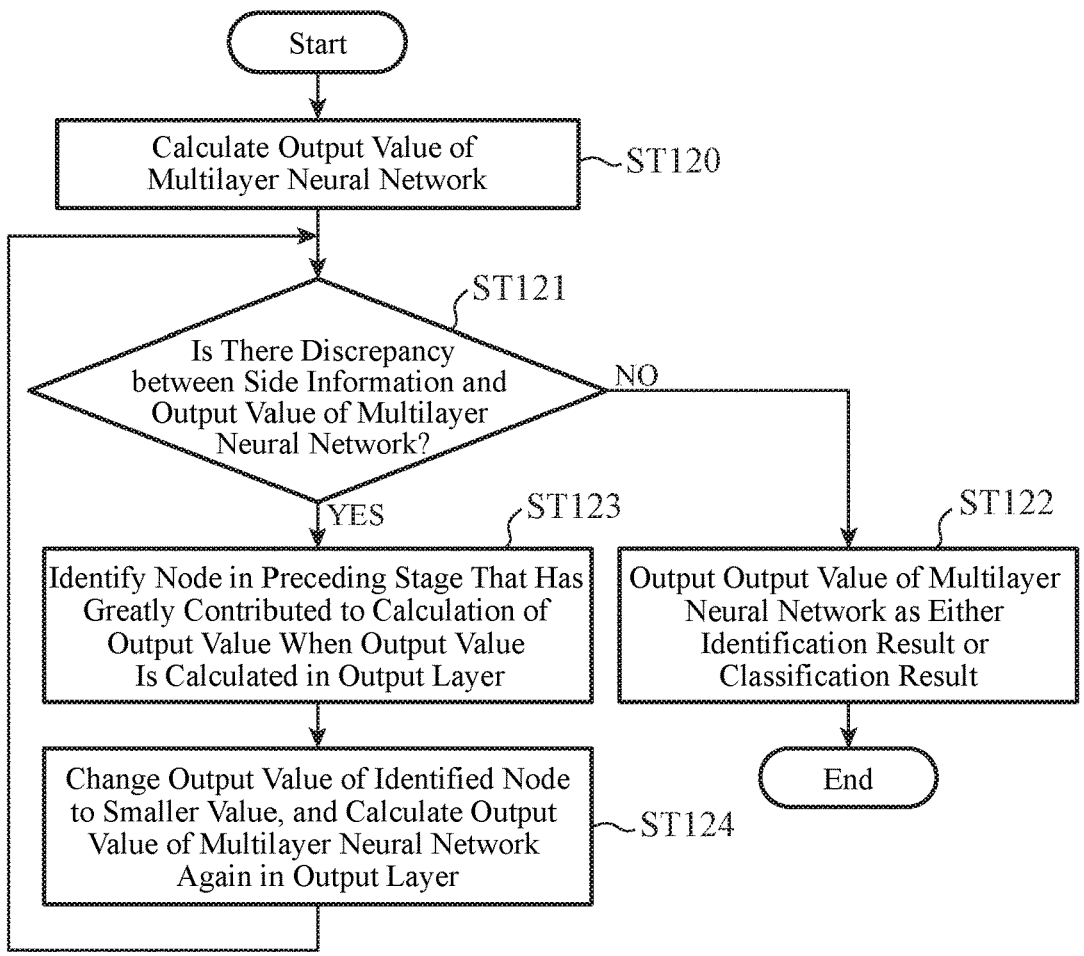
FIG. 4 is a flow chart showing an identification/classification method according to Embodiment 1.

The processor 201 implements each of the functions of the side information calculating unit 110 and the multilayer neural network 120 by reading and executing a program stored in the memory 202. More specifically, the identification/classification device 100 includes the memory 202 for storing programs in which each process in a series of processes shown in FIG. 4 is performed as a result when the program is executed by the processor 201. These programs cause a computer to perform procedures or methods that the side information calculating unit 110 and the multilayer neural network 120 have.

The memory 202 is, for example, a non-volatile or volatile semiconductor memory, such as a random access memory (RAM), a read only memory (ROM), a flash memory, an erasable programmable read only memory (EPROM), or an electrically EPROM (EEPROM); a magnetic disc, a flexible disc, an optical disc, a compact disc, a mini disc, a DVD, or the like.

Some of the functions of the side information calculating unit 110 and the multilayer neural network 120 may be implemented by hardware for exclusive use, and some of the functions may be implemented by software or firmware. For example, the functions of the side information calculating unit 110 may be implemented by the processing circuit 200 as hardware for exclusive use, and the functions of the multilayer neural network 120 may be implemented by the processor 201's reading and executing a program stored in the memory 202. In this way, the processing circuit can implement each of the above-mentioned functions by using hardware, software, firmware, or a combination of hardware, software, and firmware.

Next, the operations will be explained.

FIG. 4 is a flow chart showing an identification/classification method according to Embodiment 1.

It is assumed that before a series of processes shown in FIG. 4 is performed, learning about either the identification processing or the classification processing is performed on the multilayer neural network 120.

First, the multilayer neural network 120 performs either the identification processing or the classification processing on input data without using the side information, to calculate an output value that is a processing result (step ST120). At this time, the side information calculating unit 110 calculates the side information about either the identification processing or the classification processing on the basis of the above-mentioned input data.

The multilayer neural network 120 determines whether or not there is a discrepancy between the side information calculated by the side information calculating unit 110, and the above-mentioned output value outputted from the output layer 30 (step ST121).

For example, when receiving the side information showing that an object to be shot cannot be classified as a class c from the side information calculating unit 110 at a time when outputting an output value showing the class c to which the object to be shot is classified, the multilayer neural network 120 determines that there is a discrepancy between the above-mentioned output value and the above-mentioned side information.

Further, when receiving the side information showing that there is a very high possibility that an object to be shot belongs to a class c' from the side information calculating unit 110 at a time when outputting an output value showing a class other than the class c' as the class to which the object to be shot is classified, the multilayer neural network 120 determines that there is a discrepancy between the above-mentioned output value and the above-mentioned side information.

In addition, when receiving, as the side information, a numerical value showing likelihood that an object to be shot is classified as each of multiple classes, the multilayer neural network 120 adds a calculated value (the value of $p_j$ substituted into the above-mentioned equation (3)) before, in the output layer 30, the determination of a class that is a classification result, and the side information showing the likelihood that the object to be shot is classified as the class, for example. Next, when, for example, the addition result is smaller than a constant value, the multilayer neural network 120 determines that there is a discrepancy between the above-mentioned output value and the above-mentioned side information.

When determining that there is no discrepancy between the above-mentioned output value and the above-mentioned side information (NO in step ST121), the multilayer neural network 120 outputs the output value calculated in step ST120 as either an identification result or a classification result (step ST122). After that, the series of processes shown in FIG. 4 is completed.

Figure 5:
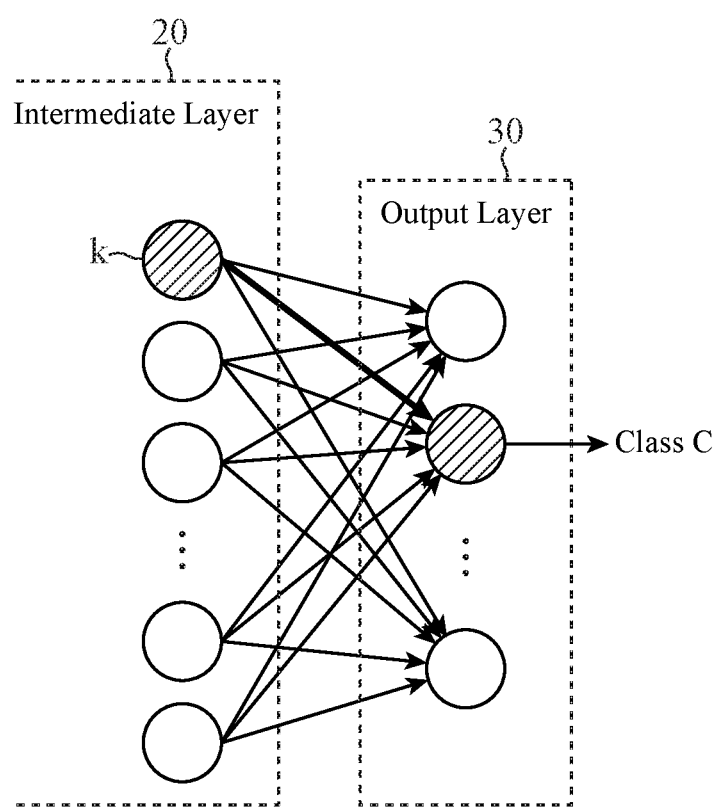
FIG. 5 is a diagram showing an overview of a process of identifying a node that contributes to the calculation of an output value of the multilayer neural network.

FIG. 5 is a diagram showing an overview of a process of identifying a node k that contributes to the calculation of the output value of the multilayer neural network 120, and shows a case in which the class classification of an object to be shot is performed by the multilayer neural network 120. It is assumed that the activating function of the output layer 30 is the softmax function, and the nodes of the output layer 30 have selected an output value showing the class c in accordance with the above-mentioned equation (3).

When determining that there is a discrepancy between the output value showing the class c and the side information (YES in step ST121), the multilayer neural network 120 identifies a node k that has greatly contributed to the calculation of the above-mentioned output value, out of the nodes included in the multiple nodes that constitute the intermediate layer 20 and existing in the stage immediately preceding the output layer 30, as shown in FIG. 5 (step ST123).

For example, when the activating function of the output layer 30 is the softmax function, and the probability $p_c$ that the object to be shot is classified as the class c is the highest, the output value showing the class c is outputted from the output layer 30. The probability $p_c$ can be calculated in accordance with the following equation (4).

In the following equation (4), the parameters associated with the multiple nodes in the stage immediately preceding the output layer 30 (the nodes in the final stage of the intermediate layer 20) are $w_{ic}$ and $x_i$. $w_{ic}$ is the weight of each edge, the weight being calculated in the learning processing performed on the multilayer neural network 120, and $x_i$ is the output value of each node in the stage immediately preceding the output layer 30.

$$p_c = \frac{e^{\Sigma_i w_{ic} x_i + b_c}}{R} \quad (4)$$

The node k that has most contributed to the fact that the probability $p_c$ has the highest value, out of the multiple nodes in the stage immediately preceding the output layer 30, can be determined in accordance with the following equation (5).

It can be said that the product of the weight $w_{ic}$ and the output value $x_i$ in the following equation (5) greatly contributes to the decision of the probability $p_c$, because the product is in the exponential part of the exponential function in the above-mentioned equation (4).

$$k = \underset{i}{\operatorname{argmax}} w_{ic} x_i \quad (5)$$

The multilayer neural network 120 determines the weight $w_{ic}$ of each edge connecting a node in the stage immediately preceding the output layer 30, and a node of the output layer 30, and the output value $x_i$ of each node in the stage immediately preceding the output layer 30. The multilayer neural network 120 then identifies the node k that has greatly contributed to the calculation of the output value showing the class c, by substituting the product of the weight $w_{ic}$ and the output value $x_i$, the product greatly contributing to the decision of the probability $p_c$, into the above-mentioned equation (5). For example, the multilayer neural network 120 may determine, as the node k, the node i that the multilayer neural network has identified by substituting the maximum output value $x_i$ into the above-mentioned equation (5).

Although the case of identifying one node as the node k is shown above, the multilayer neural network 120 may identify multiple nodes as the node k as long as each of these nodes has a large contribution (e.g., equal to or greater than a threshold) to the output value of the multilayer neural network 120.

Further, the above-mentioned equations (4) and (5) are an example of the computation expressions for identifying the node k, and the identification/classification method in Embodiment 1 is not limited to these computation expressions.

For example, the activating function of the output layer 30 may be other than the softmax function, and the computation expressions for identifying the node k may be other than the above-mentioned equations (4) and (5).

The explanation is returned to the explanation of FIG. 4.

The multilayer neural network 120 changes the output value $x_k$ of the node k identified in step ST123 to a smaller value, and performs the calculation of output values in the output layer 30 again (step ST124). Although the output value $x_k$ may just be changed to a value smaller than the previous one, a case in which the output value is changed to $x_k = 0$ will be explained hereinafter as an example.

The above-mentioned equation (1) can be expressed as the following equation (6), and the above-mentioned equation (2) can be expressed as the following equation (7). In the following equations (6) and (7), the probability $p'_j$ that the object to be shot is classified as each of the multiple classes that are subjects of classification can be calculated by, instead of simply substituting zero into $x_k$, setting $i \neq k$ and omitting the calculations about $x_k$.

In the output layer 30, the probability $p'_j$ is calculated in accordance with the following equations (6) and (7). As a result, the amount of arithmetic operations in the recalculation of output values can be reduced.

$$p'_j = \frac{e^{\Sigma_{i \neq k} w_{ij} x_i + b_j}}{R'} \quad (6)$$

$$R' = \sum_{j=1}^{C} e^{\Sigma_{i \neq k} w_{ij} x_i + b_j} \quad (7)$$

After calculating the probability $p'_j$, the output layer 30 substitutes this probability into the following equation (8), thereby identifying the j-th node at which the probability $p'_j$ is the highest.

For example, the output value of the node identified using the following equation (8) shows that the object to be shot is classified as a new class c'.

$$c' = \underset{j}{\operatorname{argmax}} p'_j \quad (8)$$

When the process of step ST124 is completed, the multilayer neural network 120 returns to the process of step ST121 again, and determines whether or not there is a discrepancy between the output value showing the new class c' and the side information.

When it is determined that there is no discrepancy between the output value showing the class c' and the side information (NO in step ST121), the output value showing the class c' is outputted as a classification result (step ST122).

In contrast, when determining that there is a discrepancy between the output value showing the class c' and the side information (YES in step ST121), the multilayer neural network 120 identifies a node k' that has greatly contributed to the calculation of the above-mentioned output value, out of the nodes in the stage immediately preceding the output layer 30 (step ST123).

For example, the multilayer neural network 120 determines a set of the node k' that has greatly contributed to the calculation of the output value showing the class c' and the node k identified as mentioned above, as $L = \{k, k'\}$, and changes the output value $x_k$ of the node k and the output value $x_{k'}$ of the node k', the nodes being included in the set L. Although the output values $x_k$ and $x_{k'}$ may just be changed to values smaller than the previous ones, a case in which the output values are changed to $x_k = 0$ and $x_{k'} = 0$ will be explained hereinafter as an example.

In the case in which the output values are changed to $x_k = 0$ and $x_{k'} = 0$, the above-mentioned equation (1) can be expressed as the following equation (9), and the above-mentioned equation (2) can be expressed as the following equation (10).

In the following equations (9) and (10), the probability $p''_j$ that the object to be shot is classified to each of the multiple classes that are subjects of classification can be calculated by, instead of simply substituting zero into $x_k$ and $x_{k'}$, omitting the calculations about the output values of the nodes included in the set L. In the output layer 30, the probability $p''_j$ is calculated in accordance with the following equations (9) and (10). As a result, the amount of arithmetic operations in the recalculation of output values can be reduced.

$$p''_j = \frac{e^{\Sigma_{i \notin L} w_{ij} x_i + b_j}}{R''} \qquad (9)$$

$$R'' = \sum_{j=1}^{C} e^{\Sigma_{i \notin L} w_{ij} x_i + b_j} \qquad (10)$$

After calculating the probability $p''_j$, the output layer 30 substitutes this probability into the following equation (11), thereby identifying the j-th node at which the probability $p''_j$ is the highest. The output value of the node identified using the following equation (11) shows that the object to be shot is classified to a new class c". After that, a node in the stage immediately preceding the output layer 30 is added to the set L every time when, in step ST121, a discrepancy occurs between the output value and the side information, and the series of processes mentioned above is repeated.

$$c'' = \underset{j}{\mathrm{argmax}} \, p''_j \qquad (11)$$

In the above explanation, the case in which when there is a discrepancy between the output value of the multilayer neural network 120 and the side information, the multilayer neural network 120 changes the output value of a node in the stage immediately preceding the output layer 30 and performs either the identification processing or the classification processing again is shown.

When there is a discrepancy between the output value of the multilayer neural network 120 and the side information, the multilayer neural network 120 may sequentially trace back and identify nodes each of which has greatly contributed to the calculation of the output value of anode in a subsequent stage, out of the multiple nodes of the intermediate layer 20, and change the output value of each of the identified nodes and perform either the classification processing or the identification processing again.

For example, when the output value of the multilayer neural network 120 is A, the multilayer neural network 120 identifies a node N1 that has greatly contributed to the calculation of the output value A, out of the nodes in the stage immediately preceding the output layer 30 (the nodes in the final stage of the intermediate layer 20).

When the output value of the identified node N1 is B, the multilayer neural network 120 identifies a node N2 that has greatly contributed to the calculation of the output value B, out of the nodes second immediately preceding the output layer 30 (the nodes in the stage immediately preceding the final stage of the intermediate layer 20).

When the output value of the identified node N2 is C, the multilayer neural network 120 identifies a node N3 that has greatly contributed to the calculation of the output value C, out of the nodes third immediately preceding the output layer (the nodes in the stage second immediately preceding the final stage of the intermediate layer 20).

Even by sequentially tracing back and identifying nodes each of which has greatly contributed to the calculation of the output value of a node in a subsequent stage in this way, either the identification rate of the identification processing or the classification accuracy rate of the classification processing can be improved.

As mentioned above, in the identification/classification device 100 according to Embodiment 1, the side information calculating unit 110 calculates side information for assisting either the identification processing or the classification processing. When there is a discrepancy between a processing result of either the identification processing or the classification processing, and the side information, the multilayer neural network 120 changes an output value of the intermediate layer 20 and performs either the identification processing or the classification processing again.

Particularly, the side information calculating unit 110 calculates the side information on the basis of input data.

By configuring the device in this way, either the identification rate of the identification processing or the classification accuracy rate of the classification processing can be improved without performing relearning on the multilayer neural network 120 on which learning has been performed.

In the identification/classification device 100 according to Embodiment 1, the multilayer neural network 120 identifies a node that has greatly contributed to the calculation of the processing result, out of the multiple nodes that constitute the intermediate layer 20, and changes the output value of the identified node and calculates the processing result again.

Particularly, the multilayer neural network 120 identifies the node that has greatly contributed to the calculation of the processing result, out of the nodes included in the nodes that constitute the intermediate layer 20 and existing in the stage immediately preceding the nodes that constitute the output layer 30. By configuring the device in this way, either the identification rate of the identification processing or the classification accuracy rate of the classification processing can be improved.

In the identification/classification device 100 according to Embodiment 1, when there is a discrepancy between the processing result and the side information, the multilayer neural network 120 sequentially traces back and identifies nodes each of which has greatly contributed to the calculation of the output value of a node in a subsequent stage, out of the multiple nodes that constitute the intermediate layer 20, and changes the output value of an identified node and calculates the processing result again.

By configuring the device in this way, either the identification rate of the identification processing or the classification accuracy rate of the classification processing can be improved.

It is to be understood that the present disclosure is not limited to the above-mentioned embodiment, and a change can be made in any arbitrary component according to the embodiment or an arbitrary component according to the embodiment can be omitted within the scope of the present disclosure.

INDUSTRIAL APPLICABILITY

Because the identification/classification device according to the present disclosure improves the identification rate or the classification accuracy rate without performing relearning on the multilayer neural network on which learning has been performed, and can be used for, for example, an image recognition device that recognizes a target seen in a shot image.

REFERENCE SIGNS LIST

10 input layer, 20 intermediate layer, 201-1, 201-2, . . . , 201-i, . . . , 201-n, 30-1, 30-2, . . . , 30-j, . . . , 30-m node, 30 output layer, 100 identification/classification device, 110 side information calculating unit, 120 multilayer neural network, 200 processing circuit, 201 processor, and 202 memory.

The invention claimed is:

1. An identification/classification device comprising:
processing circuitry performing a process:
to calculate side information for assisting either identification processing or classification processing, and
for a multilayer neural network including an input layer, an intermediate layer, and an output layer, to, when there is a discrepancy between a processing result of either the identification processing or the classification processing using data inputted to the input layer, and the side information, change an output Value of the intermediate layer and performing either the identification processing or the classification processing again.

2. The identification/classification device according to claim 1, wherein the process calculates the side information on a basis of input data.

3. The identification/classification device according to claim 1, wherein when there is a discrepancy between the processing result and the side information, the multilayer neural network identifies a node that has greatly contributed to calculation in the output layer of the processing result, out of multiple nodes that constitute the intermediate layer, and changes an output Value of the identified node and performs the calculation in the output layer of the processing result again.

4. The identification/classification device according to claim 3, wherein the multilayer neural network identifies a node that has greatly contributed to the calculation of the processing result, out of nodes included in the multiple nodes that constitute the intermediate layer and existing in a stage preceding the output layer.

5. The identification/classification device according to claim 1, wherein when there is a discrepancy between the processing result and the side information, the multilayer neural network sequentially traces back and identifies nodes each of which has greatly contributed to calculation of an output value of a node in a subsequent stage, out of multiple nodes that constitute the intermediate layer, and changes an output value of an identified node and performs calculation of the processing result again.

6. The identification/classification device according to claim 1, wherein the process calculates the side information for either the identification processing or the classification processing using image data shot with a camera.

7. The identification/classification device according to claim 6, wherein the process calculates information about a distance between the camera and an object to be shot.

8. The identification/classification device according to claim 6, wherein the process calculates type information about an object to be shot.

9. An identification and classification method comprising:
calculating side information for assisting either identification processing or classification processing; and
in a multilayer neural network including an input layer, an intermediate layer, and an output layer, when there is a discrepancy between a processing result of either the identification processing or the classification processing using data inputted to the input layer, and the side information, changing an output value of the intermediate layer and performing either the identification processing or the classification processing again.

* * * * *